(12) United States Patent
Ayme et al.

(10) Patent No.: US 8,436,245 B2
(45) Date of Patent: May 7, 2013

(54) EXPANDABLE CABLEWAY FOR AIRCRAFT WITH A STRUCTURE MADE OF COMPOSITE MATERIAL

(75) Inventors: Arnaud Camille Ayme, Toulouse (FR); Serge Thierry Roques, Cornebarrieu (FR)

(73) Assignee: Labinal, Blagnac (FR)

( * ) Notice: Subject to any disclaimer, the term of this patent is extended or adjusted under 35 U.S.C. 154(b) by 213 days.

(21) Appl. No.: 12/896,343

(22) Filed: Oct. 1, 2010

(65) Prior Publication Data

US 2011/0079429 A1  Apr. 7, 2011

(30) Foreign Application Priority Data

Oct. 2, 2009  (FR) ..................................... 09 56892

(51) Int. Cl.
*H02G 3/00* (2006.01)
*H02G 3/04* (2006.01)
*H01B 7/17* (2006.01)

(52) U.S. Cl.
USPC ......... 174/99 R; 174/98; 174/108; 174/113 R

(58) Field of Classification Search ................ 174/99 R, 174/98, 108, 113
See application file for complete search history.

(56) References Cited

U.S. PATENT DOCUMENTS

| | | | | |
|---|---|---|---|---|
| 4,372,510 A * | 2/1983 | Skypala | ............................ | 248/58 |
| 4,907,767 A * | 3/1990 | Corsi et al. | ........................ | 248/49 |
| 5,336,849 A * | 8/1994 | Whitney | ....................... | 174/72 C |
| 5,792,992 A * | 8/1998 | Handler | .......................... | 174/101 |
| 6,429,376 B1 * | 8/2002 | Mendoza | ........................... | 174/97 |
| 6,747,212 B1 * | 6/2004 | Henry | ............................. | 174/101 |
| 7,309,836 B2 * | 12/2007 | Lubanski | ........................ | 174/101 |
| 2003/0037955 A1 * | 2/2003 | Glew et al. | .................... | 174/99 R |
| 2007/0267214 A1 * | 11/2007 | Cardi | ................................ | 174/97 |
| 2008/0134477 A1 * | 6/2008 | Hart et al. | ......................... | 24/457 |
| 2008/0156931 A1 * | 7/2008 | Charon et al. | ............. | 244/110 C |
| 2010/0038129 A1 * | 2/2010 | Handler | .......................... | 174/481 |
| 2011/0068228 A1 | 3/2011 | Ayme et al. | | |

FOREIGN PATENT DOCUMENTS

| | | | |
|---|---|---|---|
| DE | 40 36 249 A1 | | 5/1992 |
| EP | 0 184 931 A2 | | 6/1986 |
| EP | 184931 A2 | * | 6/1986 |
| EP | 0184931 A2 | * | 6/1986 |
| GB | 1 354 484 | | 5/1974 |
| GB | 1354484 A | * | 5/1974 |

OTHER PUBLICATIONS

French Preliminary Search Report issued Jun. 21, 2010, in French 0956892, filed Oct. 2, 2009 (with English Translation of Categories of Cited Documents).

* cited by examiner

*Primary Examiner* — Timothy Thompson
*Assistant Examiner* — Rhadames J Alonzo Miller
(74) *Attorney, Agent, or Firm* — Oblon, Spivak, McClelland, Maier & Neustadt, L.L.P.

(57) ABSTRACT

Device for holding the cables of an aircraft onto the structure of the said aircraft, the said device having substantially the shape of a first trunking element, forming a basic trunking element, comprising means for coupling to the aircraft structure that are positioned on the side of its bottom and arranged to receive at least one cable running along the structure of the said aircraft and to provide an electrical continuity over the whole of its length, characterized in that the said basic trunking element comprises first attachment means capable of interacting with corresponding attachment means of a second trunking element, forming a lateral extension trunking element.

11 Claims, 2 Drawing Sheets

EXPANDABLE CABLEWAY FOR AIRCRAFT WITH A STRUCTURE MADE OF COMPOSITE MATERIAL

BACKGROUND OF THE INVENTION

1. Field of the Invention

The field of the present invention is that of wiring and more particularly, that of wiring of aircraft and their fastening.

2. Description of the Related Art

The structure of an aircraft is conventionally achieved by a series of circular frames, supported by longitudinal frame members and positioned evenly along the fuselage, to which bars called stringers are fastened. The skin of the aircraft is attached to this network of frames and stringers.

The cells of aircraft, whether they be aeroplanes or helicopters, are conventionally made of metal which has a certain number of advantages. In particular, the conductive character of the metal makes it possible to achieve the following functions:

- production of an electrical network for the return of current from the items of equipment of the aeroplane; the items of equipment are thus electrically connected, for the phase, to a wire carrying the electric current and, for the neutral, to the structure of the aircraft. There is therefore no need to put in place a specific current-return network.
- common earthing of the items of equipment, which makes it possible to protect these items of equipment as well as the passengers,
- creation of a common potential reference allowing the items of equipment to all have the same potential reference and to work in the same electrical voltage rate,
- protection, by a Faraday cage effect, against the direct and indirect effects of lightning which could injure the passengers and destroy the items of electrical equipment on board, and finally
- production of effective electromagnetic protection against electromagnetic radiation; specifically, when an electrical conductor is subjected to an electromagnetic field, a voltage, called an induced voltage, appears between its two ends and may cause interference, or even damage to the electrical receivers that are connected thereto. These electromagnetic fields may be created either by the radiation of an antenna or of a radar (particular directional radiation), or by circulation currents due to lightning strike and which will travel over the surface (which is more or less conductive) of the structure of an aeroplane (indirect effects of the lightning), or else by currents of high intensity which travel in the power cables of the internal electrical network of the aircraft.

The technology of aircraft cells has however evolved and the designers are turning increasingly to the use of composite materials which have good performance with respect to weight and mechanical strength and in particular to the use of carbon fibre composites.

The result of this is that the functions indicated above are no longer performed, the electrical conductivity of these composite materials being relatively low. Moreover, in carbon fibre structures (or structures called CFRP), it is essential to prevent electric wires, even those in which low-intensity currents travel, from being able to come into contact with the structure. In case of breakage of a cable or a contact of this cable with the structure of the aeroplane, a short-circuit appears with which are associated a local heating and a possible catching-fire of the carbon and the resin contained by the structure. Such a phenomenon would cause the emission of fumes that are toxic for the passengers.

It is therefore necessary, on aircraft made of composite material, to recreate the functions formerly performed by the metal structure of the aircraft.

For this, a first change has been devised, which consists in installing along the structure of the aeroplane metal or metalized cable supports in the form of trunking elements in which the electric cables are attached. These linear trunking elements, with U section, run along the fuselage to perform the functions listed above and to protect the carbon structures from possible contact with a cable of a bundle that could be broken. An example of such trunking elements is given by European patent application EP 0184931 by British Aerospace.

In order to provide appropriate electromagnetic protection, it is important not to fill these trunking elements to more than 80%. However, trunking elements in the prior art do not allow expansion performing the basic protection functions.

It is important to recognize that the aeroplanes, whether at the time of their development or during their lifetime, evolve and that the quantity of electric cables that they contain can increase. It is therefore necessary to allow an increase in the volume of wiring in order to adapt to demand while maintaining the same electromagnetic protection.

On this matter, the British patent GB1354484 is known which proposes, when the trunking element is designed, the possibility of a lateral extension of the latter by installing a second trunking element capable of being deployed to the side of the basic trunking element. This configuration first of all has the drawback of having to virtually double the weight of the trunking element, even though the necessity for an extension is not yet apparent, and, above all, because of its means of attachment to the aeroplane wall, it is positioned with the opening of the trunking elements oriented towards the aircraft wall; because of this, it leaves the cables free inside itself and therefore does not tackle the problem of protection against short-circuits on aeroplanes made of composite material.

BRIEF SUMMARY OF THE INVENTION

The object of the present invention is to remedy these drawbacks by proposing a device for fastening electric cables for an aircraft which makes it possible, if necessary, to simply and quickly increase the volume of the wiring to be held by this fastening device. This increase is preferably made by the adding of extensions, while ensuring their mechanical attachment and the electrical continuity with very low values of electrical resistance.

The object of the invention is a device for holding cables of an aircraft onto the structure of the said aircraft, the said device having substantially the shape of a first trunking element, forming a basic trunking element, comprising means for coupling to the aircraft structure that are positioned on the side of its bottom and arranged to receive at least one cable running along the structure of the said aircraft and to provide an electrical continuity over the whole of its length, characterized in that the said trunking element comprises first attachment means capable of interacting with corresponding attachment means of a second trunking element, forming a lateral extension trunking element. The said extension trunking element is, for its part, formed in order to constitute, in association with the said basic trunking element, at least one single additional trunking element and to provide electrical continuity between the two trunking elements.

A further subject of the invention is a lateral extension trunking element comprising second attachment means capable of interacting with first attachment means of a basic trunking element as described above.

In a particular embodiment, the lateral extension trunking element forms, in association with the basic trunking element, single additional trunking elements numbering more than 1.

A further subject is a device for holding a cable running along the structure of an aircraft, comprising a basic trunking element and at least one lateral extension trunking element as described above.

This configuration makes it possible to provide, in a simple, light and low-cost manner, capabilities for extending the basic trunking element in order to increase its capacity to contain cables, in case it was felt necessary during the development or the lifetime of the aeroplane.

In a particular embodiment, the basic trunking element comprises at least one connecting lug and the lateral extension trunking element comprises at least one plate facing it, the two portions in contact being treated by tin-plating, nickel-plating, silver-plating or gold-plating so as to ensure a good electrical continuity between the two trunking elements.

In another embodiment, the basic trunking element and the lateral extension trunking element are connected by at least one metallization braid so as to provide a good electrical continuity between the two trunking elements.

In a particular embodiment, the basic trunking element is substantially U-shaped and comprises at least one plug designed to hold the cable against the bottom of the U.

In a particular embodiment, the basic trunking element is a single trunking element comprising a single groove.

In another embodiment, the basic trunking element is a multiple trunking element comprising several grooves placed parallel to one another.

Advantageously, the basic trunking element comprises at least one lug providing the electrical connection of its metal portion to the current-return circuit of the equipment of the aircraft.

Its final subject is a method for extending the capability for accommodating a device for holding the cables of an aircraft to the structure of the said aircraft, the said device having substantially the shape of a first trunking element, forming the basic trunking element, comprising means for coupling to the structure of the aircraft positioned on the side of its bottom and arranged to receive at least one cable running along the structure of the said aircraft and to provide an electrical continuity over the whole of its length, characterized in that it comprises the addition of a second trunking element, forming a lateral extension trunking element, parallel to the basic trunking element.

Preferably, the method comprises a step prior to installing the basic trunking element on the structure of the aircraft of leaving a space at the side capable of housing a lateral extension trunking element therein.

The present invention also relates to an aircraft fuselage comprising at least one cable-holding device as described above.

BRIEF DESCRIPTION OF THE DRAWINGS

The invention will be better understood and other objects, details, features and advantages of the latter will appear more clearly during the following detailed explanatory description of an embodiment of the invention given as a purely illustrative and non-limiting example, with reference to the appended schematic drawings.

In these drawings.

DETAILED DESCRIPTION OF THE INVENTION

Figure 1:
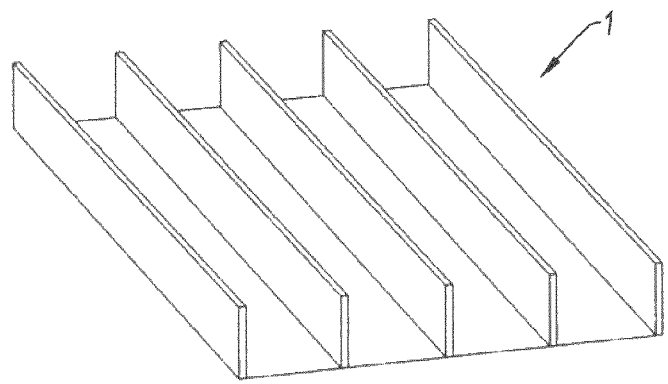
FIG. 1 is a view in perspective of a linear trunking element with multiple grooves, according to the prior art.

With reference to FIG. 1, a multiple linear trunking element 1, according to the prior art, is shown comprising four grooves with U-shaped sections. In the rest of the description, the word "cable" covers an assembly of insulated electric wires, usually linked in one or more strands, which run in the same direction over a greater or lesser length of the cell of the aircraft. Conventionally the cables are grouped together into bundles which run along the aircraft and while being installed in U-shaped trunking elements which hold them in place and protect them, the trunking elements themselves being attached to the structure of the aircraft. They are preferably made of metal material, essentially in order to prevent the effects of lightning or of electromagnetic rays.

Many advantages are provided by a trunking element 1. Its low electrical resistance allows it to establish one and the same voltage reference at both its ends; it therefore performs the functions of producing an electric network for the return of current, of common earthing of the equipment and of creating a common potential reference. Its conductive surface, when all its walls are metalized, also allows it to form a Faraday cage to protect the internal cables from the induced effects of lightning and to provide them with protection from the electromagnetic rays.

Moreover, the bottom of the trunking element being a priori positioned on the side of the wall of the aircraft, the trunking element represents, in the event of a short-circuit between cables, a protection for the adjacent composite structure against the electric arc associated with the short-circuit. Similarly, it prevents all direct contact of the electric cables that are to be contained therein, with the carbon of the aeroplane skin, and thus makes it possible to prevent the beginning of a fire with the emission of toxic fumes.

Figure 2:
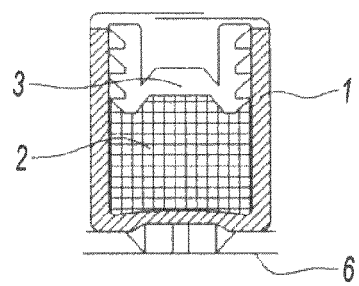
FIG. 2 is a view in section of a trunking element, according to one embodiment of the invention, enclosing a bundle of electric cables of an aircraft.

FIG. 2 shows in section a trunking element 1 according to the invention with a U-shaped section, in which a cable 2, or a bundle of cables, is placed. The section is made at the point of attachment of the trunking element 1 to the structure 6 of the aircraft. The cable 2 is held in place in the bottom of the U by a retaining plug 3 which applies pressure on the cable in the direction of the bottom of the U. The presence of a plug is essential for holding the cables from the moment when, as is desired for reasons of protection from short-circuits, the trunking element presents its bottom in the direction of the wall of the aircraft.

Figure 3:
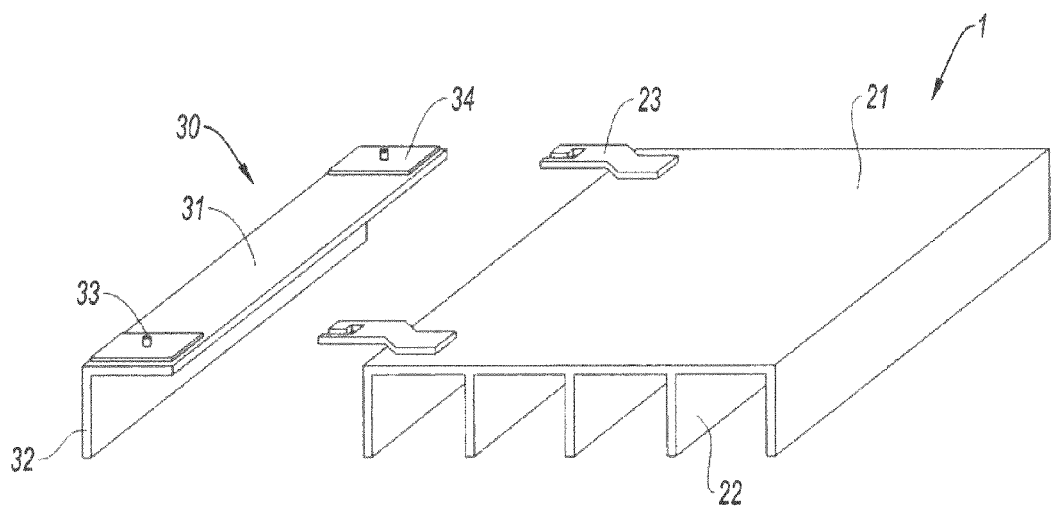
FIG. 3 is a view in perspective of a multiple trunking element and an extension trunking element in a first variant of their connection mode.
Figure 4:
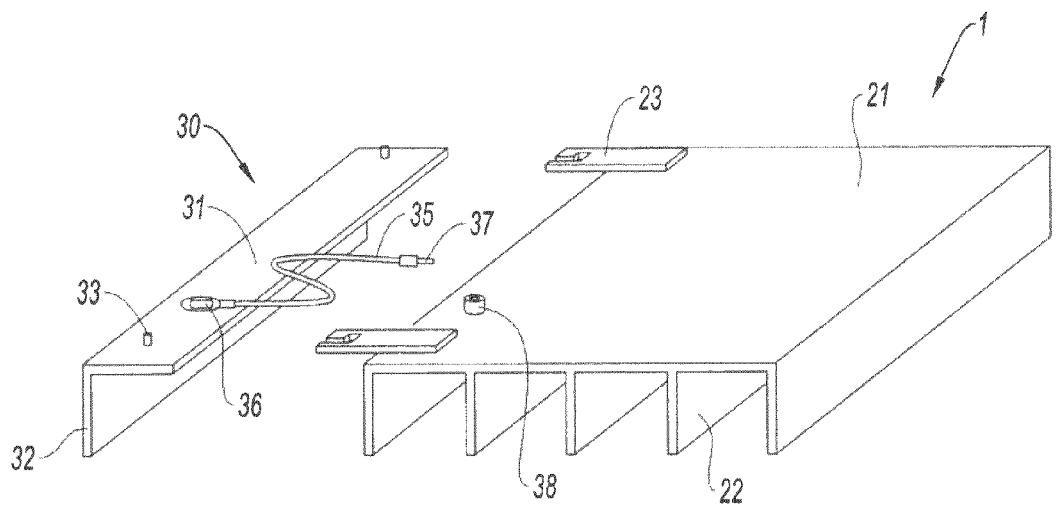
FIG. 4 is a view in perspective of a multiple trunking element and an extension element in a second variant of their connection mode.

FIGS. 3 and 4 show a multiple trunking element 1 forming a basic trunking element with a parallelepipedal shape comprising a bottom 21 from which walls 22 extend perpendicularly forming between them and with the bottom 21 single trunking elements. This trunking element comprises means (not shown) for coupling to the wall of the aircraft, which means are positioned so as to interact with the bottom 21 of the latter. Also shown is an extension trunking element 30 in the form of a section piece with an L-shaped section, comprising a bottom 31 from which a wall 32 extends perpendicularly. This extension trunking element is intended to be attached to the multiple trunking element 1 at one of its outer walls 22 in order to form an additional single trunking element. The multiple trunking element 1 comprises attachment lugs 23 forming first attachment means, attached to its bottom 21 and distributed repetitively over its length, which lugs form, with interacting attachment means 33 mounted on the extension trunking element means for attaching the extension trunking element 30 to the multiple trunking element 1.

Figure 5:
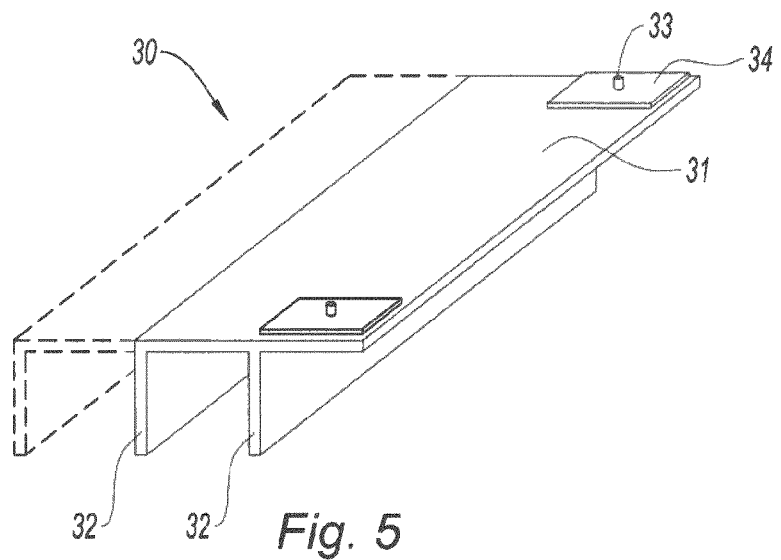
FIG. 5 is a view in perspective of a multiple extension trunking element.

In a variant shown in FIG. 5, the extension trunking element is a multiple trunking element, that is to say that it is formed to generate, in association with the basic trunking element 1, a plurality of additional single trunking elements. In the example shown, the extension trunking element makes it possible to create two additional single trunking elements; a possible third additional trunking element is shown in dashed lines.

As shown in FIGS. 3 to 5, the second means 33 for attaching the extension trunking element 30 are threaded pins which are welded or crimped onto its bottom 31. The attachment lugs 23 also have, on their face parallel to the bottom 21 of the multiple trunking element 1, a hook-shaped cut-out in which the corresponding pin 33 is housed, for an attachment by a means such as a nut (not shown) which immobilizes the lug 23 against the bottom 31 of the extension trunking element. It should be noted that the main trunking element is usually mounted on the wall of the aircraft with a space left free between itself and the wall so that the mounting of the lateral trunking element on the basic trunking element and the clamping of the attachment means 33 to the lugs 23 can be carried out with no particular difficulty.

In a first variant, shown in FIGS. 3 and 5, back-plates 34, made of material treated to ensure a good electric conductivity, are riveted or welded to the bottom 31 at the pin 33 in order to ensure a good electric contact with the attachment lug 23 of the multiple trunking element 1, which is itself made of electrically treated material. In this variant, the attachment lugs 23 have a Z-shaped longitudinal form in order to alleviate the extra thickness generated on the side of the extension trunking element by the back-plate 34.

In a second version, shown in FIG. 4, which has no specially treated back-plate, the electrical continuity is provided by a metallization braid 35. As shown, without this shape being imperative, it comprises an annular end in the form of a ring terminal 36. The second end has the shape of a quick-attach male end piece 37 designed to be coupled to a female contact 38 which is attached to the multiple trunking element 1 and which provides a good electrical contact with it.

In order to perform the functions formerly performed by the metal structure on an aircraft in which at least a portion of this structure is made of composite material, a basic trunking element 1 according to the invention comprises a metal element over the whole of its length which provides the electrical continuity from one of the ends of the trunking element to the other. It may for example be made in the form of a section piece made either by a fold of a thin metal sheet, by an extruded section piece or an aluminium moulded section piece. A version made of extruded plastic which is then metalized on the inside by a conductive deposit under vacuum or by an electrolytic deposit can be imagined for configurations in which only EMC protection is to be produced.

It is formed to be mounted with its bottom oriented towards the wall of the aircraft in order to prevent possible contact of the metal conductor of a cable, of which the sheathing might be broken, with the composite material of the aircraft. For this, its means for coupling to the wall of the aircraft are positioned on the side of the bottom 21 of the trunking element. It is also connected, for example by means of lugs, to the current-return network installed on the aircraft. This gives an electrical continuity for the current-return network.

It is also possible to add to the trunking element 1 an inner coating made of a material of the polytetrafluorethylene (or PTFE, better known by the trade name Teflon) type, which makes it possible to not abrade the insulation of the wiring and to reduce the risk of short-circuit within the bundle.

In order to be effective and ensure the Faraday cage effect that they are supposed to provide despite their opening on one of their sides, it is repeated that the trunking elements 1 should not be filled to more than 80% of the height of their lateral walls 22. Because the bottom 21 of the trunking element is positioned facing the wall of the aircraft, it is necessary to install plugs 3 at intervals in the trunking element to hold the cables 2 inside the latter.

The storage capacity of the single or multiple trunking elements is therefore limited and may turn out to be insufficient, notably on aeroplane projects in development where the definition of the electrical installation is not stable. Previously, if, during the development of an aeroplane, it was found that the fill rate of the trunking elements 1 resulted in exceeding 80% of the height of the walls, there was no other solution than to redefine and then manufacture a more voluminous trunking element, which involved very considerable expenditure and electrical installation reworks.

With extension trunking elements such as those described with reference to FIGS. 3 to 5, and provided that sufficient lateral spare space has been provided, it is possible now to increase the cable-running capacity at will without having to revise the basic definition.

The lug 23 for attaching the basic trunking element is preferably attached a priori to the basic trunking element 1 when the latter is installed in the aeroplane, which makes it easier subsequently to install a basic trunking element if the need was felt, and this can be done without significant penalty to the aeroplane in terms of weight and cost.

An important point should however be raised; it involves the quality of the electric connection of these extensions to the single or multiple trunking element on which it is mounted. To achieve this objective of a very high electrical-connection quality, two types of solutions can be envisaged:

by direct contact between the basic trunking element 1 and the extension trunking element 30. In this case, the contact surfaces receive an appropriate electric treatment for having a low contact resistance (tin-plating, nickel-plating, silver-plating, gold-plating etc.). This treatment must be compatible with the environmental conditions encountered (humidity, heat, saline mist, moulds, contaminating liquids, etc.).

by a conductive braid with connection by ring terminals or with fast connection as shown in FIG. 4. The latter solution makes it possible to avoid local contaminations of the zones of mechanical connection between the basic trunking element 1 and the extension trunking element(s). The quick-connection solution makes it possible to reprogram the possibility of subsequently adding extensions in a very short time and without particular operations on the aeroplane.

Although the invention has been described with reference to a particular embodiment, it is very clear that it comprises all the technical equivalents of the means described and their combinations if the latter form part of the context of the invention.

The invention claimed is:

1. A device for holding cables of an aircraft onto a structure of the aircraft, comprising:
a basic trunking element including
a first bottom,
means for coupling the basic trunking element to the aircraft structure, the means for coupling being positioned on a first side of the first bottom of the basic trunking element, and
first attachment means for interacting with corresponding attachment means of a lateral extension trunking element,
wherein the basic trunking element is arranged to receive at least one cable running along the structure of the aircraft and to provide an electrical continuity over a whole length of the device,
wherein the lateral extension trunking element includes a second bottom,
wherein an external edge of the first bottom faces an external edge of the second bottom, and
wherein the second bottom is free from overlap with the basic trunking element.

2. The device for holding cables according to claim 1, wherein the lateral extension trunking element further comprises second attachment means for interacting with the first attachment means of the basic trunking element.

3. The device for holding cables according to claim 2, wherein the lateral extension trunking element forms, in association with the basic trunking element, a number of single additional trunking elements greater than 1.

4. The device for holding cables according to claim 2,
wherein the basic trunking element further includes at least one connecting lug, and
wherein the lateral extension trunking element further includes at least one plate disposed on the second bottom, such that a contact between the connecting lug and the at least one plate ensures an electrical continuity between the basic trunking element and the lateral extension trunking element.

5. The device for holding cables according to claim 2, wherein the basic trunking element and the lateral extension trunking element are connected by at least one metallization braid so as to provide an electrical continuity between the basic trunking element and the lateral extension trunking element.

6. The device for holding cables according to claim 1, wherein the basic trunking element is substantially U shaped and further includes at least one plug designed to hold the cables against a bottom of the U shape.

7. The device for holding cables according to claim 1, wherein the basic trunking element further includes at least one lug having a metal portion, the at least one lug providing an electrical connection between the metal portion and a current-return circuit of equipment of the aircraft.

8. A method for extending a capacity of a device for holding cables of an aircraft to a structure of the aircraft, the device having a basic trunking element, including
a first bottom, and
means for coupling the basic trunking element to the structure of the aircraft, the means for coupling being positioned on a first side of the first bottom; and
a lateral extension trunking element including a second bottom,
wherein the basic trunking element is arranged to receive at least one cable running along the structure of the aircraft and to provide an electrical continuity over a whole length of the device, the method comprising:
aligning an external edge of the first bottom with an external edge of the second bottom; and
attaching the lateral extension trunking element to the basic trunking element, such that the lateral extension trunking element is parallel to the basic trunking element and the second bottom is free from overlap with the basic trunking element.

9. The method according to claim 8, further comprising leaving a space at a side capable of housing a lateral extension trunking element therein prior to installing the basic trunking element on the structure of the aircraft.

10. An aircraft fuselage comprising at least one device for holding cables according to claim 1.

11. A device for holding cables onto a structure of an aircraft, comprising:
a basic trunking element including
a first bottom,
a first wall attached to and extending away from a first side of the first bottom,
a second wall attached to and extending away from the first side of the first bottom, the second wall spaced apart from the first wall by a first distance, and
an attachment lug disposed on a second side of the first bottom, wherein the first side of the first bottom is opposite the second side of the first bottom; and
a lateral extension trunking element including
a second bottom,
a third wall attached to and extending away from a first side of the second bottom, and
an attachment pin disposed on a second side of the second bottom, wherein the first side of the second bottom is opposite the second side of the second bottom,
wherein the attachment lug cooperates with the attachment pin to attach the lateral extension trunking element to the basic trunking element,
wherein the first wall, the second wall, and the first bottom define a first concavity configured to receive a first cable running along the structure of the aircraft,
wherein the second bottom, the third wall, and the first wall define a second concavity configured to receive a second cable running along the structure of the aircraft,
wherein an edge of the second bottom faces an edge of the first bottom, and
wherein the second bottom is free from overlap with the basic trunking element.

* * * * *